(12) United States Patent
Neckelmann

(10) Patent No.: US 12,263,982 B2
(45) Date of Patent: Apr. 1, 2025

(54) SYSTEM AND A METHOD FOR PACKAGING PRODUCT INTO SEPARATE BAGS

(71) Applicant: TRIVISION A/S, Odense (DK)

(72) Inventor: Ole K. Neckelmann, Odense (DK)

(73) Assignee: TRIVISION A/S, Odense C (DK)

( * ) Notice: Subject to any disclaimer, the term of this patent is extended or adjusted under 35 U.S.C. 154(b) by 57 days.

(21) Appl. No.: 18/016,486

(22) PCT Filed: Jun. 25, 2021

(86) PCT No.: PCT/EP2021/067462
§ 371 (c)(1),
(2) Date: Jan. 17, 2023

(87) PCT Pub. No.: WO2022/012901
PCT Pub. Date: Jan. 20, 2022

(65) Prior Publication Data
US 2023/0271735 A1  Aug. 31, 2023

(30) Foreign Application Priority Data

Jul. 16, 2020 (EP) .................................... 20186115

(51) Int. Cl.
*B65B 9/00* (2006.01)
*B29C 65/00* (2006.01)
(Continued)

(52) U.S. Cl.
CPC ................ *B65B 9/08* (2013.01); *B29C 65/18* (2013.01); *B29C 65/7457* (2013.01);
(Continued)

(58) Field of Classification Search
CPC .................................... B65B 9/00; B65B 9/08
See application file for complete search history.

(56) References Cited

U.S. PATENT DOCUMENTS 3,668,815 A * 6/1972 Henry .................... B65B 1/22
53/437
4,091,595 A * 5/1978 Pelster .................... B65B 9/13
493/227
(Continued)

FOREIGN PATENT DOCUMENTS

EP 2671810 A1 12/2013
EP 3647024 A1 5/2020
(Continued)

OTHER PUBLICATIONS

Extended European Search Report from corresponding European Patent Application EP 20186115.0, Apr. 20, 2021.
(Continued)

*Primary Examiner* — Praachi M Pathak
(74) *Attorney, Agent, or Firm* — Workman Nydegger

(57) ABSTRACT

A system for packaging a product into separate bags, including a station for providing a partly closed bag and adding a quantity of the product into the partly closed bag, a closing station for closing the partly closed bag with the quantity of the product therein, a separating station for separating the closed bag from the sheet-shaped material, and an analyzing station for analyzing the closed bag, where the analyzing station is positioned between the closing station and the separating station and where the closed bag hangs from another bag when analyzed.

15 Claims, 1 Drawing Sheet

(51) Int. Cl.
  *B29C 65/18*  (2006.01)
  *B29C 65/74*  (2006.01)
  *B29C 65/82*  (2006.01)
  *B65B 9/08*   (2012.01)
  *B65B 25/00*  (2006.01)
  *B65B 51/30*  (2006.01)
  *B65B 57/04*  (2006.01)
  *B65B 61/02*  (2006.01)
  *B65B 61/12*  (2006.01)
  *B29L 31/00*  (2006.01)

(52) U.S. Cl.
  CPC .... *B29C 65/8253* (2013.01); *B29C 66/43121* (2013.01); *B29C 66/8491* (2013.01); *B65B 25/001* (2013.01); *B65B 51/30* (2013.01); *B65B 57/04* (2013.01); *B65B 61/02* (2013.01); *B65B 61/12* (2013.01); *B29L 2031/7128* (2013.01)

(56) References Cited

U.S. PATENT DOCUMENTS

| | | | | |
|---|---|---|---|---|
| 4,322,929 A * | 4/1982 | Neumann | ................. | B65B 9/20 53/551 |
| 4,617,683 A * | 10/1986 | Christoff | ............. | B29C 66/4322 53/139.2 |
| 5,255,497 A * | 10/1993 | Zoromski | ............. | B65B 9/2042 53/551 |
| 5,540,035 A * | 7/1996 | Plahm | ............... | B29C 66/83421 53/550 |
| 5,836,136 A * | 11/1998 | Highberger | ......... | B29C 66/8224 53/551 |
| 6,233,902 B1 * | 5/2001 | Nakagawa | .............. | B65B 57/12 53/74 |
| 6,460,312 B1 * | 10/2002 | Nakagawa | ............ | B65B 51/306 53/550 |
| 6,534,137 B1 * | 3/2003 | Vadhar | .................... | B32B 27/08 428/474.9 |
| 6,675,558 B2 * | 1/2004 | Kinigakis | ......... | B29C 66/81431 53/412 |
| 6,761,012 B2 * | 7/2004 | Rusert | .................... | B65D 75/12 53/410 |
| 6,945,008 B2 * | 9/2005 | Nakagawa | .............. | B65B 61/28 53/55 |
| 7,640,715 B2 * | 1/2010 | Hefner | .................... | B65B 9/213 53/410 |
| 8,776,481 B2 * | 7/2014 | Miyahara | ................ | B65B 29/04 53/551 |
| 10,934,033 B2 * | 3/2021 | Ichikawa | .............. | B65B 9/2014 |
| 11,472,149 B2 * | 10/2022 | Rapparini | ............... | B31B 70/18 |
| 2012/0096807 A1 * | 4/2012 | Okuma | .................... | A61J 1/10 53/111 R |
| 2013/0342676 A1 | 12/2013 | Amano et al. | | |
| 2017/0183110 A1 | 6/2017 | Garthaffner et al. | | |
| 2018/0257801 A1 | 9/2018 | Persson | | |
| 2019/0127092 A1 * | 5/2019 | Ichikawa | ................ | B65B 61/06 |
| 2020/0031507 A1 | 1/2020 | Otxoa-Aizpurua Calvo et al. | | |
| 2020/0394786 A1 | 12/2020 | Yokouchi et al. | | |

FOREIGN PATENT DOCUMENTS

| | | |
|---|---|---|
| WO | 9954205 A1 | 10/1999 |
| WO | 2019187601 A1 | 10/2019 |

OTHER PUBLICATIONS

International Search Report from corresponding PCT Application No. PCT/EP2021/067462, Sep. 13, 2021.

* cited by examiner

SYSTEM AND A METHOD FOR PACKAGING PRODUCT INTO SEPARATE BAGS

BACKGROUND

The present invention relates to a system and a method for packaging products into separate bags and in particular to a system and a method where analysis is performed of the closing of the bags before the bags are separated.

It has been found that the closed portions of individual bags tend to be directed in undesired directions when the bag is closed and separated from the other bags. This makes subsequent inspection, which is often based on a vision technology, difficult. The present invention relates to a solution to that problem.

Systems of this type may be seen in EP2671810.

SUMMARY

Another aspect of the invention relates to a system for packaging a product into separate bags, the system comprising:
- a station for converting a sheet-shaped material into a partly closed bag and adding a quantity of the product into the partly closed bag,
- a closing station for closing the partly closed bag with the quantity of the product therein,
- a separating station for separating the closed bag from the sheet-shaped material, and
- an analysing station for analysing the closed bag,
- where the analysing station is positioned between the closing station and the separating station.

In the present context, the system may form part of a production line where product and the sheet-shaped material are received and the final, filled and separated, bags are output. Thus, the system may comprise additional elements or stations, such as quality check stations, weighing stations, packaging stations, printing/labelling stations and the like.

A station may be a separate element of the system, but a position of the system may have multiple functions, stations or operations, so that two stations may be provided at the same position of the system.

Converting a sheet-shaped material, such as a foil, into a partly closed bag may be obtained in a number of manners. Often, the sheet-shaped material is folded to form a tube, where one end may be closed, such as in a process of also closing a bag formed immediately before. This resulting, partly closed container or bag then receives the product.

A sheet-shaped material usually is a material which has a thickness, along a first direction, and a length and width in two directions perpendicular to the first direction, where the length and width are at least 10 times the thickness.

The sheet-shaped material may be sealable to itself, such as using glue/adhesive or by being capable of being softened/molten by welding, heating, ultrasound, radiation, friction or the like.

In this connection, a bag may be any type of container made from a sheet-shaped material. The bag may be sealed in an airtight manner or may comprise openings. Preferably, the openings are of a size where the product cannot escape the bag via an opening.

The product may be a monolithic product, such as a single piece of cheese, an apple, a bar of soap or the like. The product may be a liquid product, such as liquid soap, or may be formed by a number of individual elements, such as apples or nuts. In a particular situation, the product for an individual bag is formed by a large number of small product units, such as separated lettuce leafs (e.g. rocket salad), grated cheese, spices (black pepper corns, powder or the like) or the like.

Especially in the latter situation, the integrity of a bag closure may be of interest, as lighter products formed by a number of units may have such units distributed more evenly in the bag and thus at or in the portion to be sealed/closed.

The station for converting the sheet-shaped material into a partly closed bag may simply fold/bend the sheet-shaped material onto itself and seal/close the material along a longitudinal line. In that manner, the sheet-shaped material may be shaped into a funnel or tunnel-shaped portion. This portion may be closed at one end to receive and hold the material more easily before the final closing at the closing station.

A quantity of the product is added into the partly closed bag. The quantity may be a predetermined number, such as 1, 2, 3, 4, 5 product units. Alternatively, a predetermined amount of product by weight or volume may be provided and added to the partly closed bag.

The closing station is configured to close the partly closed bag with the quantity of the product therein. This closing may be any type of closing, such as one of the manners mentioned above. The closing preferably closes the bag to a degree so that the product therein cannot escape. In some situations, the sheet-shaped material and/or the bag is desired to have openings so that moisture may be transported between the product and the surroundings. In other situations, it is desired that the closed bag is at least substantially airtight, such as when the product is stored in a protective atmosphere.

The separating station is configured to separate the closed bag from the sheet-shaped material. This separation may be a cutting action, such as using a pair of scissors, a knife, a hot blade or the like. In another situation, a perforation may be provided so that separation of the bags may be performed by pulling. Also, heating or laser cutting may be used if desired. Often, the sheet-shaped material is in the shape of a partly closed bag, so that the separating station separates a bag from a partly closed bag.

The analysing station is configured to analyse the closed bag. This analysis may be a check of the integrity of the closures of the bag. If a bag is not sufficiently closed, or if a closure thereof is insufficient, such as if a part of the product is provided in the closure, the bag may be discarded for quality reasons. A closure may also be insufficient if insufficient glue was present or if insufficient heat/radiation was available so that the material has not reached a sufficient temperature to ensure sufficient sealing.

The analysing station may be based on vision, where a camera is used for imaging the relevant portions of the bag, such as the closures thereof. In a particular embodiment, the closures of interest are the closures closest to neighbouring bags—the closures at the upper and lower end of the bag. Especially the portion sealed or closed at the closing station may be of interest, as this closure was made with the product in the partly closed bag. As mentioned, this material may find its way into the closure and thus destroy the integrity thereof.

Another type of analysis is that of a labelling or print on the closed bags. Especially when the bags are stretched, as is described below, the labelling or print may be stretched and thus more easily imaged and thus checked.

According to the invention, the analysing station is positioned between the closing station and the separating station. In this context, "between" will mean that the analysis is performed after closing but prior to the separation. The physical positions of the stations may be selected in any desired manner, as the bags may be transported in meandering paths in a production facility.

Now, the closed bag is analysed before being separated from the sheet-shaped material. Then, the separation of the bag may now be a separation of the bag from another closed bag (which may be connected to another closed bag or a partly closed bag and thus the sheet-shaped material), or a partly closed bag or even the sheet-shaped material.

When the closed bag is still connected to the sheet-shaped material (often in the shape of another bag), the closed portion thereof may be more easily controlled and thus analysed by the analysing station. In one situation, a direction or plane of the closed portion of the bag may be controlled by controlling the movement of the closed bag and of the sheet-shaped material (such as the bag it is connected to). In that manner, the direction of the closed portion may be directed more optimally in relation to the analysing station or a sensing portion thereof.

According to the invention, the analysing station is positioned at least substantially vertically below the closing station. Thus, the closed bag may hang from or be supported or prevented from dropping downwardly, by the upper or later produced closed bag or the partly closed bag. Clearly, the closed bag may be supported by a slanted surface so as to better define a distance from the analysis station to the bag. In general, the attachment of the closed bag to the upper bag, such as a partly closed bag, may be what is preventing at least an upper portion of the closed bag from moving downwardly.

At least substantially vertically may mean that in the analysing portion, the bag, such as a central portion thereof (centre of mass, for example, or a lower portion thereof, is provided, relative to a portion of the closing portion engaging a bag, along a straight line deviating less than 45 degrees, such as less than 30 degrees, such as less than 20 degrees, such as less than 10 degrees, such as less than 5 degrees from vertical.

When the analysing station is below the closing station, the weight of the closed bag will act to stretch the closed bag and the portion to be analysed.

The system may operate in steps so that in each step, closing of a lower portion takes place, closing of an upper portion takes place, a providing of the product takes place and a separation may take place. Then, between steps. The bags and sheet-like material may move, and a longitudinal weld or closing may be performed, and the analysis may be performed. Visual analysis easily may be performed on information provided while the product moves.

In one embodiment, the analysing station is configured to determine an integrity of a closure of the closed bag. In this context, the integrity may be a sealing degree or completeness. A sealing may have an area or width, where the integrity may relate to a minimum area or width of the sealing which is free from contaminations or which has a sufficient degree of sealing.

Sealing may be obtained by adding a glue or adhesive. In that situation, the integrity of the seal would be low if the glue/adhesive did not span the full closure. If a contamination prevented the glue from closing a portion of the area or width to be closed, the glue cannot perform its sealing function and the seal integrity is low. The integrity may then be quantified by the length of the lacking sealing along a length of the sealing. Alternatively, the sealing integrity may be a binary decision of OK or not OK.

If the sealing is obtained by heating/welding, the integrity could relate to whether the heating/welding was performed sufficiently along the full width of the closure. This sealing quality may be determined visually, such as by a change in colour or appearance of the material from before sealing and until after sealing. Again, the integrity may be quantified by the length of any lacking sealing along a length of the sealing. Alternatively, the sealing integrity may be a binary decision of OK or not OK.

Further alternatively, the sealing quality or integrity may be determined based on whether some of the product is seen at the position of the sealing. Green lettuce leafs or yellow cheese would be easily spotted if positioned in the sealed portion of a transparent foil. Thus, if a discolouring is seen at the position of the seal or closing, the integrity may be assumed to be compromised.

In one embodiment, the analysing station comprises a camera configured to output images of closures of bags and a processor configured to analyse the images and output information relating to integrity of the individual closures. The camera may be positioned above/below a conveyor on which the closed bag is moving, or at a position where the closure performed by the closing station is seen. Typically, the closure performed by the closing station is oblong and, at least at the analysing station, more or less in a predetermined plane, where the camera may then be positioned outside of that plane and preferably viewing the closure along a direction perpendicular to that plane. The analysing station may also comprise light emitters and the like for ensuring optimal conditions for the imaging of the camera.

Analysis of closures is a known art, and there are many manners of determining or checking the quality of a closure of a sheet-shaped material.

One reason for a closure to have a reduced closure quality or integrity is where some of the product extends into the closed area. If this product does not extend all the way through the closure, the closure may, in fact, be seen as uncompromised.

Then, it may be decided which minimum thickness or width, often in a direction along the longitudinal direction of the bag (from one end closure to the other end closure) of the closure can be accepted. If the closure fulfils this requirement, it may be found sufficient even though product extends into the closure or even though the closure was not complete over its full length.

Then, the closure, which is often between two bags, may be made broader. Hitherto, the two bag closures would be separate closures with a portion of non-closed sheet-shaped material between them.

If the closure between the two bags was a single, wide closure, it would be possible to determine where to separate the two bags inside this closure. Thus, even if a portion of the product extended into the wide closure from one side, the remaining width of the closure may be sufficient to allow for sufficient closures of both bags.

Alternatively, the closure of one bag may be selected to have a sufficient width, whereas that of the other bag is then not sufficient.

Thus, in one embodiment, the separating station is configured to determine a separating position between two adjacent, closed bags, and to separate the two adjacent, closed bags at the determined position.

Actually:
   the analysing station may be configured to determine a
      position between two adjacent, closed bags and output
      position information, and the separating station may be configured to receive the position information and separate the two adjacent, closed bags at the determined position.

Thus, the determination of the position for the separation may be made based on the output of the analysing station. Usually, the analysing station will analyse that particular closure in the first place so that the basis for the analysis may already be available.

In one embodiment, the closing station comprises a gripping element fixing an upper part of a bag to be closed and is configured to provide a perforation between the bag to be closed and a partly closed bag, the system further comprising an element for engaging and pulling a lower portion of a closed bag to separate, at the perforation, the closed bag from the bag to be closed. In this context, a perforation may be a plurality of holes or weakened portions between the two bags. Perforation may be provided using knives, needles, lasers, heated elements or the like.

Naturally, the gripping element may be used for closing the bag to be closed so that the bag hereafter is closed. The gripping element may be a pair of jaws or the like. Such elements may for example be used for heat sealing or the like.

Thus, the upper portion of this bag is fixed. Then, if a lower bag, such as a bag attached to the bag with the fixed upper portion, is engaged, by the separation station, and pulled away from the fixed bag, the perforation may break so that the bags are separated. This lower bag may be engaged at its lower end or at any other position thereof.

It may be desired that the lower end of the bag is engaged by the separating station, as the upper portion of the bag may be analysed by the analysing station. Visual inspection is made more difficult if that portion is engaged by e.g. force transmitting elements.

A fourth aspect relates to a method of packaging a product into separate bags, the method comprising:
repeatedly:
from a sheet-shaped material, forming a partly closed bag,
adding a quantity of the product to the partly closed bag,
closing the partly closed bag with the product quantity therein,
separating the closed bag from the sheet material and analysing the closed bag,
wherein the separating step is performed after the analysing step.

Clearly, all embodiments, situations and considerations of the above aspects of the invention area equally relevant in relation to these aspects of the invention.

When the sheet-shaped material is repeatedly partly closed, added material and finally closed, different portions, such as sequential portions of the material is thus converted from sheet-shaped material into bags in which the product is provided. These process steps may be performed simultaneously but on different portions of the sheet-shaped material.

As mentioned above, the product may be single, monolithic products or products formed by many individual product portions/units, such as a grains, leafs, powder or the like.

The adding of the product may comprise a providing of a predetermined quantity, such as a predetermined number, weight or volume.

The adding may also comprise providing a quantity of a predetermined gas in the bag to, for example, protect the product.

The step of forming a partly closed bag may comprise one or more sealing steps. As described above, multiple manners exist of sealing or closing sheet-shaped materials.

Naturally, all sealing or closing steps need not utilize the same type of sealing. Some steps may comprise the use of glue where other steps may utilize heat welding, for example.

The separation step may, as described above, be performed using a cutting tool or using heat/radiation or any other manner desirable.

The analysis, as described above, may be any type of analysis. The preferred analysis type is based on an imaging of the bag and especially a closure or sealing thereof.

As mentioned above, the separating step is performed after the analysing step. In this manner, it is noted that the analysing step may comprise firstly obtaining information from the closed bag, such as the imaging of a portion of the closed bag. Subsequently, an analysis may be performed based on the information obtained. This subsequent analysis may be performed subsequently to the separating step. The obtaining of the information, however, is made prior to the separating step.

In one embodiment:
the step of forming the partly closed bag comprises a step of closing a bottom of the partly closed bag,
the step of closing the partly closed bag comprises closing an open top of the partly closed bag.

The step of forming the partly closed bag may also comprise closing a side portion of the bag. This side closing may be performed prior to or simultaneously with the closing of the bottom portion. The closing of the side portion may be the conversion of a sheet of material into a tunnel or funnel shaped element. Closing the tunnel/funnel shaped element at a bottom thereof may provide the partly closed bag.

Preferably, the partly closed bag has an upwardly directed opening and is closed at its lower portions so that the product may be received in the partly closed bag and may be maintained in the partly closed bag due to gravity.

In one embodiment, the steps of closing the bottom of one partly closed bag and of closing an open top of an adjacent, partly closed bag, are performed simultaneously.

This is also seen in the prior art and has the advantage that two closures may be performed in one step and at one location. Real estate or footprint is valuable in production lines and the more functions that can be performed at one location, the better.

In one embodiment, the closing step comprises providing a perforation between the closed bag and the partly closed bag and wherein the separating step comprises separating the closed bag from the partly closed bag at the perforation. Then, the perforation may be performed in the closing step in approximately the same manner and at the same position as the prior art cutting process.

Then, it may be desired that the separation takes place simultaneously with the closing step. This is especially relevant when the closing of the bag to be closed takes place while a portion, such as an upper portion, of that bag is fixed. Then, the closed bag may be pulled to break the perforation or weakened portion between the bags. The closed bag may be engaged at any desired position, such as a lower portion thereof. This pulling may stretch the closure of the bag and thus cater for analysis thereof in the same process.

In one embodiment, the analysing step comprises determining an integrity of a closure of the closed bag. This is described above and is usually made based on an imaging of the closure.

Again, the image data is provided before the separating step, but the analysis may be performed after the separating step, especially if it is known where the separation is to be performed. A controlling or registering may be performed so that the separation is performed in a particular or predetermined position either in relation to the bag(s), the closure(s) and/or in e.g. an image thereof.

In a preferred embodiment, the analysing step comprises generating images of closures of bags, analysing the images and outputting information relating to integrity of the individual closures. In this respect, the step of generating the images may be performed before the separating step, where the remaining steps may be performed after the separating step if desired.

As is also described above, the separating step may comprise determining a separating position between two adjacent, closed bags, and separating the two adjacent, closed bags at the determined position. In this situation, the separating position may be selected so that the closure of at least one but preferably both bags is sufficient.

In an embodiment:
the analysing step comprises determining a position between two adjacent, closed bags and
the separating step comprises separating the two adjacent, closed bags at the position.

This position may be determined using image analysis and based on e.g. a minimum thickness/width of a sealing which is assumed or expected to be suitable.

Actually, a further aspect of the invention is related to the above aspects but relates to the providing of print or one or more labels on to the closed bags before separation thereof, and especially when the closed bag(s) is/are stretched as described above. Thus, in addition to or instead of the analysis step, a labelling or printing action may be performed on the closed bag between the closing of the bag and the separation of the closed bag from the sheet-shaped material, such as next to or instead of the analysing station. Naturally, all other aspects, embodiments, situations and the like of the above aspects are equally relevant in this connection.

BRIEF DESCRIPTION OF THE DRAWINGS

In the following, preferred embodiments of the invention will be described with reference to the drawing, wherein.

DETAILED DESCRIPTION OF VARIOUS EMBODIMENTS

Figure 1:
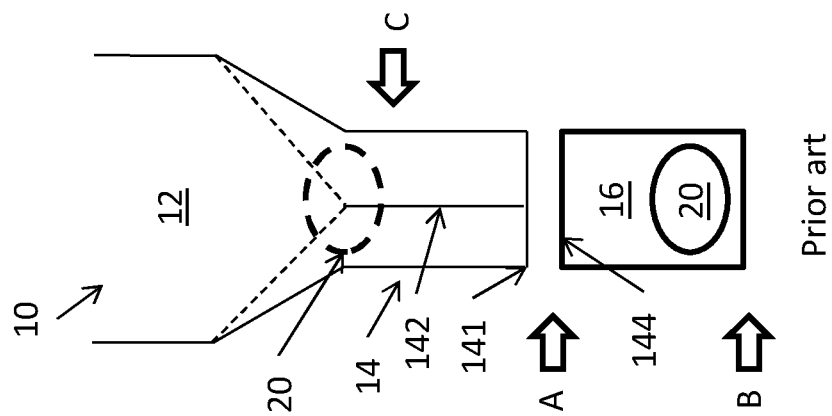
FIG. 1 illustrates a prior art method of providing product into separate bags.

In FIG. 1, a prior art system 10 is illustrated for producing bags and providing a product therein. In a station C, the bags are formed from a sheet-like material 12, such as a foil, which is folded and assembled, such as heat welded, to obtain an elongate weld or connection 142. In addition, a lower weld 141 is provided so that the sheet-like material is shaped as a partly closed container or bag 14 which is closed at the bottom and at the sides, so that a product 20 may be provided in this partly closed bag 14 before final closing.

The final closing, now of the upper end of the bag, is also often performed by welding or heating, creating the upper weld 144. In the same step, the folded and elongatedly welded sheet-like material is welded at the bottom. Also, when the upper and lower welds have been generated, the closed bag is separated from the newly formed partly closed bag by cutting, at station A.

This technology has the advantage that the welding may be performed by two heated jaws which generate the two welds and between which a cutting device may be provided. Thus, the cutting is simple, as the cutting position is between the two jaws.

A problem, however, is seen when wanting to quality check the bags 16. Usually, the product 20 is provided in the partly closed bag while this bag is open at the top. Then, gravity will assist in the delivering of the material into the partly closed bag. In that manner, it is the intention that the material will not extend to the upper weld, as material in this weld would render the weld useless and the bag thus not suitable for sale.

However, many types of material are not cooperative in this respect. Lettuce, spices, grated cheese and the like has a tendency to either build tall structures or distribute itself on the inner surface of the bag so that it may also be provided in the bag weld.

For that reason, it is desired that an analysing station B is provided which is capable of analysing the welds, and especially the end welds 141 and 144, of the bag 16.

Figure 2:
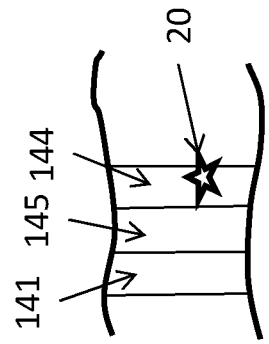
FIG. 2 illustrates a prior art bag seen from the side.

When the product is delivered to the lower portion of the bag, the separated bag 16 will not have product evenly distributed therein, whereby the lower weld 141 may be more or less hidden under the product, as seen in FIG. 2. Also, very often, the end portions 141/144 will be pointing upward or downward. Visual analysis of the welds usually is from above or below, whereby this is made difficult by the welded areas pointing away from or toward the camera.

According to a preferred embodiment, the manner of partly closing the bag and the introduction of the product 20 therein may be as described above.

However, having performed the welding or closing creating the upper weld 144 and the lower weld 141, the bags are not separated. Thus, a sequence of interconnected bags is provided, as is seen in FIG. 3.

When the weld 144 is still connected to the weld 141 and the lower bag hangs from the upper bag (which may be closed or partly closed—or even be the sheet-like material), the bags will align the welded areas with vertical and pull the welds to force them into a more linear and straight shape. Then, analysis, in station B, is made easier. Also, the interconnection of a weld 141 to a weld 144 will act to prevent the weld 141 from bending and more or less overlap with the product when seen from the side, so that also for this reason, analysis may be made easier.

Even though the advantage obtained by having the lower bag hang from the upper bag at the analysis station B may be obtained at any position after the closing station C, it is preferred that the analysis station B is provided more or less below the closing station C. Thus, the imaging may be provided immediately after closing. Also, this is advantageous when the bag handling is in steps. Providing the imaging between two step positions of the closings makes the overall set-up shorter.

Figure 3:
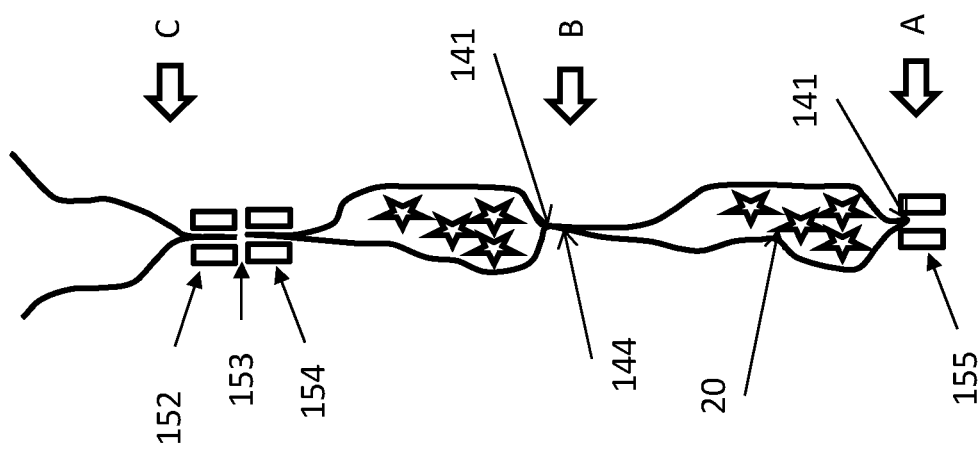

In FIG. 3, a sequence of bags, formed and filled at station C, is seen where the weld 144 is connected to the weld 141. Thus, the analysis may be performed of both welds using the analysis station B. Having then analysed the welds 141 and 144, the separation may be performed, such as at station A.

Clearly, the welding or closing may be obtained using the legacy manners, such as heating, gluing, welding or the like.

Also, the weld or closure analysis may be as performed hitherto, such as using a camera/vision based technology where the weld/closing is imaged and then analysed in order to ascertain that the weld/closure is sufficient for the product to be sealed and thus suitable for sale.

The separation process may also be as performed hitherto, such as using a knife/cutter or a laser, for example.

In a particularly relevant embodiment, the separation is performed by severing a perforation performed at the closing step. The step of closing the lower end of a partly closed bag and the upper end of a bag to be closed may be performed using two welding jaws 152 and 154, one, 152, closing the lower end of an upper bag, a partly closed bag, and one, 154, for closing the upper portion of a lower bag to provide a closed bag. In this process, means 153 may be provided for perforating an area between the two welds.

Then, after analysis of the welds, separation of the bags may be performed by engaging, using the jaws 155, the earlier or lower bag, such as at its lower end, and pulling it away from the later or upper bag to sever the perforation. This may be performed while the upper or later bag is having its upper end welded so that it is engaged or fixed by the lower welding jaw.

The separation station may be positioned at, or even combined with, the analysis station, as the separation position in some embodiments is determined individually for each pair of bags. The bags may extend/contract slightly and even twist or in other manners deform the separation zone between the welds 141/144. The analysis station may image the adjacent weld(s) of the two bags and may then determine the best position to separate and thus separate the two bags. Especially when the separation is by cutting and not by severing a pre-positioned perforation.

A distance or space 145 may be provided between the two welds 141/144, such as a non-welded portion of the sheet 12, as is illustrated in FIG. 5, so that the separating position may be determined at or through this zone.

Alternatively, a wider welding may be provided between two adjacent bags. In this manner, if product extends into this weld, a separating position may be determined outside of the contaminated portion while ensuring that both bags are sufficiently closed. In this manner, bags with product in the welding may nevertheless be found suitable for sale.

Figure 4:
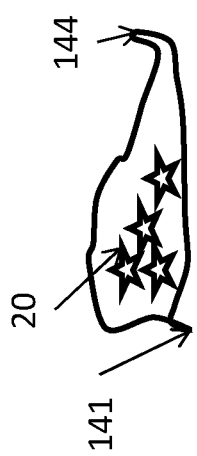
FIG. 3 illustrates the sequence of bags seen from above as well as the analysis and cutting stations and FIG. 4 illustrates the welds 141/144.

In FIG. 4, the weld 144 is compromised as the product 20 extends all the way through it. However, if also the area 145 was part of the weld, this particular pair of bags could be separated at a position in the area 45 and thus provide suitable welds of both bags.

Thus, the separating station A may be configured to cut the bags at a position determined by the analysis station B or another analysis element, such as forming part of the separating station A. This analysis may relate to determining a cutting position from which a predetermined minimum weld width is provided to one bag or both bags, so that suitably sealed bags are produced.

In general, bags which after analysis have been found to not be sufficiently sealed may be opened and the product re-introduced into another bag at the top of the system 10.

The invention claimed is:

1. A system for packaging a product into separate bags, the system comprising:
   a station for converting a sheet-shaped material into a partly closed bag and adding a quantity of the product into the partly closed bag,
   a closing station for closing the partly closed bag with the quantity of the product therein and obtaining a closed bag,
   a separating station for separating the closed bag from the sheet-shaped material, and
   an analyzing station configured to obtain information from a closure of the closed bag while the closed bag hangs from the sheet-shaped material, a partly closed bag, or another closed bag;
   wherein the analyzing station is further configured to analyze, based on the information, the closure of the closed bag;
   wherein the analyzing station is positioned between the closing station and the separating station and further positioned at least substantially vertically below the closing station.

2. The system according to claim 1, wherein the analyzing station is configured to determine an integrity of the closure of the closed bag.

3. The system according to claim 1, wherein the analyzing station comprises a camera configured to output images of closures of bags and a processor configured to analyze the images and output information relating to integrity of each of the closures of bags.

4. The system according to claim 1, wherein the separating station is configured to determine a separating position between two adjacent, closed bags, and to separate the two adjacent, closed bags at the determined position.

5. The system according to claim 1, wherein:
   the analyzing station is configured to determine a position between two adjacent, closed bags and output position information, and
   the separating station is configured to receive the position information and separate the two adjacent, closed bags at the position.

6. The system according to claim 1, wherein the closing station comprises a gripping element fixing an upper part of a first partly closed bag and is configured to provide a perforation between the partly closed bag and a second partly closed bag, the system further comprising an element for engaging and pulling a lower portion of the closed bag to separate, at the perforation, the closed bag from the first partly closed bag.

7. A method of packaging a product into separate bags, the method comprising:
   repeatedly:
   from a sheet-shaped material, forming a partly closed bag,
   adding a quantity of the product to the partly closed bag,
   closing the partly closed bag with the product quantity therein,
   while the closed bag hangs from the sheet-shaped material, a partly closed bag or another closed bag, analyzing the closed bag by obtaining information from a closure of the closed bag and analyzing, based on the information, the closure of the closed bag, and
   separating the analyzed, closed bag from the sheet-shaped material, the partly closed bag or the other closed bag.

8. The method according to claim 7, wherein:
   the step of forming the partly closed bag comprises a step of closing a bottom of the partly closed bag,
   wherein the step of closing the partly closed bag comprises closing an open top of an adjacent partly closed bag.

9. The method according to claim 8, wherein the steps of closing the bottom of one partly closed bag and of closing an open top of the adjacent, partly closed bag, are performed simultaneously.

10. The method according to claim 7, wherein the closing step comprises providing a perforation between the closed bag and the partly closed bag and wherein the separating step comprises separating the closed bag from the partly closed bag at the perforation.

11. The method according to claim 10, wherein the separation takes place simultaneously with the closing step.

12. The method according to claim 7, wherein the analyzing step comprises determining an integrity of the closure of the closed bag.

13. The method according to claim 7, wherein the analyzing step comprises generating images of closures of bags, analyzing the images and outputting information relating to integrity of each of the closures of bags.

14. The method according to claim 7, wherein the separating step comprises determining a separating position between two adjacent, closed bags, and separating the two adjacent, closed bags at the determined position.

15. The method according to claim 7, wherein: the analyzing step comprises determining a position between two adjacent, closed bags and the separating step comprises separating the two adjacent, closed bags at the determined position.

* * * * *